US 9,001,703 B2

(12) United States Patent
Kuehner

(10) Patent No.: US 9,001,703 B2
(45) Date of Patent: Apr. 7, 2015

(54) SCALABLE BROADBAND GROUP CALL VIA UNICAST DOWNLINK TRAFFIC CONSOLIDATION AND LOCAL RE-BROADCAST

(71) Applicant: Motorola Solutions, Inc., Schaumburg, IL (US)

(72) Inventor: Nathanael P. Kuehner, Rolling Meadows, IL (US)

(73) Assignee: Motorola Solutions, Inc., Schaumberg, IL (US)

( * ) Notice: Subject to any disclaimer, the term of this patent is extended or adjusted under 35 U.S.C. 154(b) by 236 days.

(21) Appl. No.: 13/674,304

(22) Filed: Nov. 12, 2012

(65) Prior Publication Data

US 2014/0133318 A1    May 15, 2014

(51) Int. Cl.
| | | |
|---|---|---|
| *H04L 12/16* | (2006.01) | |
| *H04Q 11/00* | (2006.01) | |
| *H04W 4/06* | (2009.01) | |
| *H04W 4/10* | (2009.01) | |
| *H04W 76/00* | (2009.01) | |
| *H04W 4/02* | (2009.01) | |
| H04W 88/04 | (2009.01) | |

(52) U.S. Cl.
CPC ......... *H04W 4/06* (2013.01); *H04W 4/10* (2013.01); *H04W 76/005* (2013.01); *H04W 88/04* (2013.01); *H04W 4/023* (2013.01)

(58) Field of Classification Search
CPC .... H04M 3/56; H04M 3/51; H04L 29/06027; H04Q 2213/13072
USPC .......................................... 370/260, 261, 270
See application file for complete search history.

(56) References Cited

U.S. PATENT DOCUMENTS

| | | |
|---|---|---|
| 5,995,500 A | 11/1999 | Ma et al. |
| 6,522,886 B1 | 2/2003 | Youngs et al. |
| 7,164,930 B2 | 1/2007 | Korneluk et al. |
| 7,631,100 B2 | 12/2009 | Ben-Zvi et al. |
| 2004/0071128 A1* | 4/2004 | Jang et al. ................ 370/349 |
| 2007/0133455 A1 | 6/2007 | Kuchibhotla et al. |
| 2009/0023460 A1* | 1/2009 | Cho et al. .............. 455/456.2 |

(Continued)

FOREIGN PATENT DOCUMENTS

| | | |
|---|---|---|
| EP | 1988724 A1 | 11/2008 |
| WO | 0162026 A1 | 8/2001 |

(Continued)

OTHER PUBLICATIONS

International Search report dated Jun. 10, 2014 counterpart of PCT/US2013/069411.

*Primary Examiner* — Ronald B Abelson
(74) *Attorney, Agent, or Firm* — Daniel R. Bestor

(57) ABSTRACT

A method, system, and device consolidate unicast downlinks in a broadband radio access network (RAN) for a requested group call. A subset of subscriber devices of the group in sufficiently close proximity is detected, one subscriber device in the subset is selected to act as a subscriber device to subscriber device broadcast downlink repeater (SD-BDR), and group call data is transmitted to each subscriber not in a subset via a separate unicast downlink, and to each subset via a single outbound unicast link to the selected subscriber device. The selected SD-BDR in each subset then re-broadcasts the group call data to the other members of the subset, thereby reducing outbound broadband resource usage in the broadband RAN.

20 Claims, 10 Drawing Sheets

(56) References Cited

U.S. PATENT DOCUMENTS

2009/0290575 A1* 11/2009 Simon .......................... 370/352
2011/0201275 A1   8/2011 Jabara et al.
2012/0099499 A1*  4/2012 Jang et al. .................... 370/311
2012/0265818 A1  10/2012 Van Phan et al.
2013/0250771 A1   9/2013 Yu et al.
2013/0324177 A1  12/2013 Wiatrowski et al.

FOREIGN PATENT DOCUMENTS

| WO | 2001062026 A1 | 8/2001 |
| WO | 2004030387 A1 | 4/2004 |
| WO | 2004086791 A1 | 10/2004 |
| WO | 2009042695 A1 | 4/2009 |
| WO | 2009128751 A1 | 10/2009 |

* cited by examiner

SCALABLE BROADBAND GROUP CALL VIA UNICAST DOWNLINK TRAFFIC CONSOLIDATION AND LOCAL RE-BROADCAST

FIELD OF THE DISCLOSURE

The present disclosure relates generally to improving efficiencies in group calls over broadband networks by consolidating unicast downlink traffic in a broadband radio access network (RAN) for a requested group call.

BACKGROUND OF THE DISCLOSURE

Radio access networks (RANs) provide for radio communication links to be arranged within the network between a plurality of user terminals. Such user terminals may be mobile and may be known as 'mobile stations' or 'subscriber devices.' At least one other terminal, e.g. used in conjunction with subscriber devices, may be a fixed terminal, e.g. a control terminal, base station, eNodeB, repeater, and/or access point. Such a RAN typically includes a system infrastructure which generally includes a network of various fixed terminals, which are in direct radio communication with the subscriber devices. Each of the fixed terminals operating in the RAN may have one or more transceivers which may, for example, serve subscriber devices in a given region or area, known as a 'cell' or 'site', by radio frequency (RF) communication. The subscriber devices that are in direct communication with a particular fixed terminal are said to be served by the fixed terminal. In one example, all radio communications to and from each subscriber device within the RAN are made via respective serving fixed terminals. Sites of neighboring fixed terminals may be offset from one another or may be non-overlapping or partially or fully overlapping.

RANs may operate according to an industry standard protocol such as, for example, an open media alliance (OMA) push to talk (PTT) over cellular (OMA-PoC) standard, a voice over IP (VoIP) standard, or a PTT over IP (PoIP) standard. Typically, protocols such as PoC, VoIP, and PoIP are implemented over broadband RANs including third generation and fourth generation networks such as third generation partnership project (3GPP) Long Term Evolution (LTE) networks. Communications in accordance with any one or more of these standards, or other standards, may take place over physical channels in accordance with one or more of a TDMA (time division multiple access), FDMA (frequency divisional multiple access), OFDMA (orthogonal frequency division multiplexing access), or CDMA (code division multiple access) protocols. Subscriber devices in RANs such as those set forth above send user communicated speech and data, herein referred to collectively as 'traffic information', in accordance with the designated protocol.

Many public safety narrowband RANs provide for group-based radio communications amongst a plurality of subscriber devices such that one member of a designated group can transmit once and have that transmission received by all other members of the group substantially simultaneously. Groups are conventionally assigned based on function. For example, all members of a particular local police force may be assigned to a same group so that all members of the particular local police force can stay in contact with one another, while avoiding the random transmissions of radio users outside of the local police force.

Either randomly or in response to an incident or event, such as a fire or accident, a number of subscriber device group members may congregate to within a single RF site. Due to the nature of the broadband connection, each group member subscriber device is conventionally provided with a separate unicast downlink over the broadband RAN. Accordingly, for example, if ten (10) subscriber devices in a group have roamed into a single RF site of a conventional broadband RAN, a corresponding fixed node serving that site receives group call data during an active group call from an infrastructure device via ten separate unicast transmissions over a backhaul downlink to the fixed node, and provides the group call data to each of the ten subscriber devices over ten separate unicast air interface downlinks (e.g., channels). Accordingly, if too many group subscriber devices roam into the single RF site, or the call data being communicated consumes substantial bandwidth (e.g., video, audio/video, etc.) there arises a risk that the backhaul downlink capacity, fixed node processing capability, or available air interface downlink capacity may become overloaded, perhaps resulting in reduced call data quality, dropping of connections to some or all group member subscriber devices, or other types of service interruptions or delays.

For example, when the event or incident occurs, numerous different groups may respond to the incident, including for example, first responders such as police, fire, and medical groups and supporting responders such as utility, traffic control, crowd control groups, among others. Each of these groups may attempt to, and may actually secure, resources on one or more of the broadband RANs available at the incident location. Given the limited availability of broadband RF resources on any one RAN available at or near the incident location, however, subscriber devices that are members of the first responders groups and/or supporting responders groups may be unable to secure broadband RF resources at the incident scene, resulting in an inability of some or all members of each group to communicate with other members of the group For example, as shown in FIG. 1, an example broadband RAN 100 may include a first fixed node 102 serving RF sites 104 and 105, and a second fixed node 108 serving RF sites 104, 110, and 111. Fixed node 102 may be coupled to fixed node 108 and to a call controller 114 via a network 112 and a backhaul including downlink 116 and uplink 117. Fixed node 108 may similarly be coupled to fixed node 102 and to the call controller 114 via the network 112 and a backhaul including downlink 118 and uplink 119. Although not illustrated here, network 112 may include any number of additional infrastructure equipment to support group calls, including but not limited to switches, routers, gateways, authentication systems, subscriber device registration and location systems, system management, and other devices providing other operational functions.

In one example, broadband RAN 100 may be an LTE network and fixed nodes 102 and 108 eNodeBs. Network 112 may include an LTE evolved packet core, and subscriber devices being served by eNodeBs 102 and 108 may include compatible LTE transceivers. Communications sent over the LTE eNodeBs may be one of a varied number of communications types, including the above-mentioned data, voice (including OMA-PoC, VoIP, or PoIP), audio, video, audio/video, or some other type of media, perhaps transmitted using one or more other voice or data protocols such as real-time transport protocol (RTP) or session initiation protocol (SIP). Group call distribution may be handled at the call controller and evolved packet core via repeated IP unicast transmissions to each subscriber device in the group.

The LTE evolved packet core may contain known subsystems required for operation of the LTE RAN. Such subsystems may include, for example, sub-systems providing authentication, routing, subscriber device registration and location, system management and other operational functions within the LTE RAN. For example, the LTE evolved packet core may include one or more devices including, for example, a serving gateway (S-GW), a mobile management entity (MME), a home subscriber server (HSS), a Policy and Charging Rules Function (PCRF), and a packet data network (PDN) gateway (P-GW). The S-GW may function to route and forward data packets, while also acting as a mobility anchor for the user data plane during inter-eNodeB handovers and as the anchor for mobility between LTE and other 3GPP technologies, among other possibilities. The MME may function to track and page idle subscriber devices, authenticate subscriber devices (via interactions with the HSS), enforce subscriber device roaming restrictions, and handle security, key management, among other possibilities. The HSS may provide a central database that contains user-related and subscription-related information and may aid in subscriber device system roaming, call and session establishment support, and user authentication and access authorization. The PCRF may function to provide charging and credit control for user data flows, and may provide for QoS assignments to user data flows. The P-GW may function to provide connectivity from the served subscriber devices to external packet data networks (such as IP network or a POTS network) by being the point of exit and entry of traffic for the subscriber devices. The P-GW may also be involved in performing policy enforcement, packet filtering, and charging support. Fewer or more, and other types of, infrastructure devices may also be present and/or incorporated into the evolved packet core. The broadband RAN 100 in FIG. 1 may be an LTE RAN.

As illustrated in FIG. 1, three subscriber devices 120a, 120b, and 120c belonging to a first subscriber group have registered with the broadband RAN at fixed node 102 and have established separate unicast downlinks (three over backhaul downlink 116 and air interface downlinks 152-156). Similarly, three subscriber devices 130a, 130b, and 130c also belonging to the first subscriber group have registered with the broadband RAN at fixed node 108, and have established separate unicast downlinks (three over backhaul downlink 118 and air interface downlinks 157-160). Finally, three subscriber devices 140a, 140b, and 140c also belonging to the first subscriber group are outside of the range of the broadband RAN 100 or turned off, and have thus not established any connections with the broadband RAN 100. All subscriber devices in FIG. 1, with the exception of subscriber device 130c, are illustrated as mobile radios. Subscriber device 130c is illustrated as a vehicular subscriber device having a larger battery source and larger transmit power than the mobile radios. Of course, other types (including smart phones, cellular phones, tablet computers, etc.), other mixtures of devices, and other numbers of subscriber devices could be used in different scenarios and in other embodiments.

In the state illustrated in FIG. 1, and assuming a user at subscriber device 130a desires to transmit a call to the first subscriber group, a new group call request is transmitted to call controller 114 over air interface uplink 150, corresponding backhaul uplink 119, and network 112. Call controller 114 receives the new group call request, identifies the target group (the first subscriber group) indicated in the new group call request (e.g., associated with the group identified in the new group call request), and identifies the active target subscriber devices subscribed to the first subscriber group, including subscriber devices 120a, 120b, 120c, 130b, and 130c. The call controller 114 than acknowledges the new group call request to the source subscriber device 130a, and routes subsequently received call data from the source subscriber device 130a to the active target subscriber devices 120a, 120b, 120c, 130b, and 130c in the first subscriber group via separate unicast transmissions over backhaul downlinks 118, 116 and over separate air interface downlinks 152-156, 158, and 160. In other words, call controller 114 duplicates call data packets received from source radio 130a for each target subscriber device and sends the duplicated data via separate unicast downlinks to each target subscriber device subscribed to the group associated with the new group call request. Although not illustrated in FIG. 1, each target subscriber device 120a, 120b, 120c, 130b, and 130c also maintains separate unicast air interface uplinks for sending acknowledgments and/or control or status signaling to call controller 114 before, during, and/or after the group call. Due to the packet duplication and separate unicast downlinks used in conventional broadband RANs, this example group call initiated by source subscriber device 130a consumes five times (5×) the backhaul downlink 116, 118 bandwidth and air interface downlink 152-156, 158, 160 bandwidth as is used for a point to point (non-group) call. While group target subscriber devices are not too numerous, and/or are well distributed, conventional broadband RANs generally provide sufficient available bandwidth to meet the demands of such a group call.

However, and as illustrated in FIG. 2, as group target subscriber devices in broadband RAN 100 begin to congregate near one another, a demand on a limited available infrastructure may increase to a point that call quality is lowered or subscriber devices are unable to join or receive a group call. For example, in FIG. 2, subscriber device 120b has moved from RF site 104 to RF site 110 and is now receiving service from the broadband RAN 200 via fixed node 108. Subscriber devices 140a-c have powered on and/or moved into RF site 110 as well. Accordingly, for a same group call sourced from subscriber device 130a, call controller 114 must duplicate the call data eight times (8×), six of which traverse backhaul downlink 119 and separate unicast air interface downlinks 158-168. In some instances, this level of call data transmission load may be reaching, or already reached, a maximum load capacity at the fixed node 108, perhaps due to limited infrastructure backhaul downlink capacity, limited processing capacity at the fixed node 108, or air interface capacity at the fixed node 108, among other possibilities. As a result, existing calls, including the first group call described above, may exhibit decreased quality, and additional subscriber devices may be denied or unable to continue receiving existing calls or create or join new calls. For example, in one scenario, subsequently arriving fire incident responders may be unable to register with the broadband RAN 100 via fixed node 108, or may be denied the transmission of a new call to other fire incident responders or dropped from an existing call, due to a lack of sufficient resources in the broadband RAN 100.

Accordingly, there is a need for an improved solution that would allow an infrastructure device, such as call controller 114, to improve efficiency of group calls over broadband RANs by selectively consolidating unicast downlinks in the broadband RAN for a requested new group call, and to manage the consolidation during the group call.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
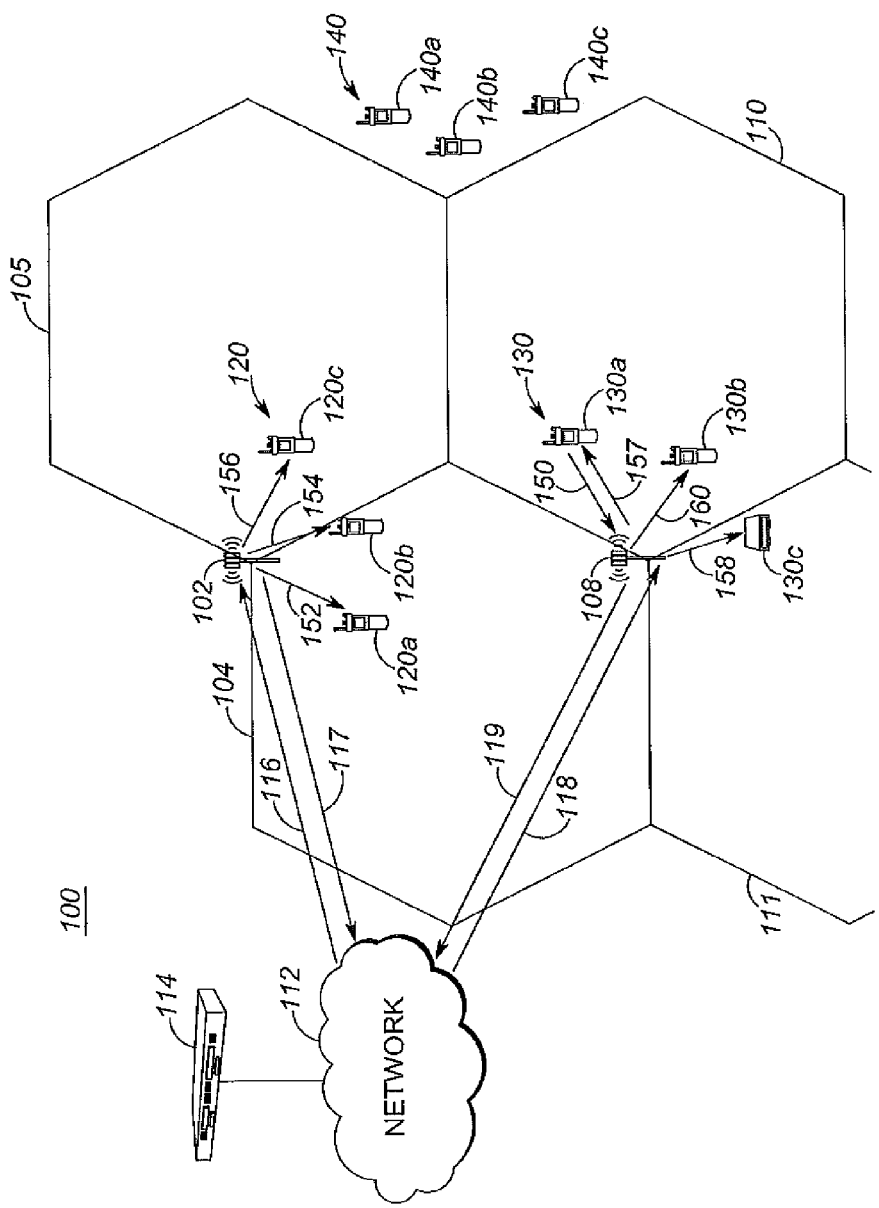
FIG. 1 is a schematic diagram of a conventional broadband radio access network.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DISCLOSURE

In light of the foregoing, it would be advantageous to provide an improved solution that allows an infrastructure device, such as a call controller, to improve efficiency of group calls over broadband RANs by selectively consolidating unicast downlinks in the broadband RAN for a requested group call, and to manage the consolidation during the group call. A call controller may identify a subset of subscriber devices of the group that are in sufficiently close proximity, select one subscriber device in the subset to act as a subscriber device to subscriber device broadcast downlink repeater, and cause group call data to be transmitted to all of the subscriber devices in the subset via a single consolidated unicast transmission over a backhaul downlink and an air-interface downlink to the selected subscriber device, which is instructed to re-broadcast the group call data to the other members of the subset. As a result, outbound broadband resource usage is substantially reduced, and an increased capacity and/or an increased numbers of subscriber devices can be supported for a group call in a broadband RAN without adding additional infrastructure.

In one embodiment, a network infrastructure device (NID) and method for consolidating unicast downlinks in a broadband RAN for a requested group call is disclosed. The NID receives a group call request from a requesting device and identifies a plurality of target subscriber devices indicated by the group call request for participation in the group call. The NID also identifies at least a first subset of target subscriber devices out of the plurality of target subscriber devices that are determined to be within an air-interface downlink wireless communication range of at least one other target subscriber device in the first subset, and selects one of the plurality of target subscriber devices in the first subset as a subscriber device to subscriber device broadcast downlink repeater (SD-BDR) for all of the other target subscriber devices in the first subset and informing the selected one of the plurality of target subscriber devices in the first subset that it is the selected SD-BDR for the first subset. The NID receives group call data, from the requesting device, associated with the requested group call, and provides the group call data received from the requesting device to each target subscriber device in each identified subset via a corresponding single unicast downlink in the RAN to the subset's corresponding selected SD-BDR and to each target subscriber device not in a subset via corresponding separate single unicast downlinks in the RAN.

In another embodiment, a subscriber device and method for consolidating unicast downlinks in a broadband RAN for a requested group call is disclosed. The subscriber device, responsive to receiving a request from a call controller, one of (i) provides a geographic location of the SD-BDR capable subscriber device to the call controller and (ii) broadcasts a beacon to nearby subscriber devices, receives beacons broadcast from the nearby subscriber devices, and reports measured beacon parameters of the beacons broadcast from the nearby subscriber devices to the call controller. The subscriber device then receives an instruction from the call controller indicating that the SD-BDR capable subscriber device has been selected by the call controller to rebroadcast received group call data associated with the requested group call to other target subscriber devices in a first subset of subscriber devices identified by the call controller, receives the group call data from call controller via a single unicast downlink in the RAN, plays back the group call data at the SD-BDR capable subscriber device via one of an output transducer and a display, and rebroadcasts the group call data locally to the other target subscriber devices in the first subset.

Each of the above-mentioned embodiments will be discussed in more detail below, starting with device and network architectures of the system in which the embodiments may be practiced, followed by a discussion of the downlink consolidation process from the point of view of the call controller and the participating subscriber devices. Further advantages and features consistent with this disclosure will be set forth in the following detailed description, with reference to the figures.

I. Device and Network Architectures

Figure 2:
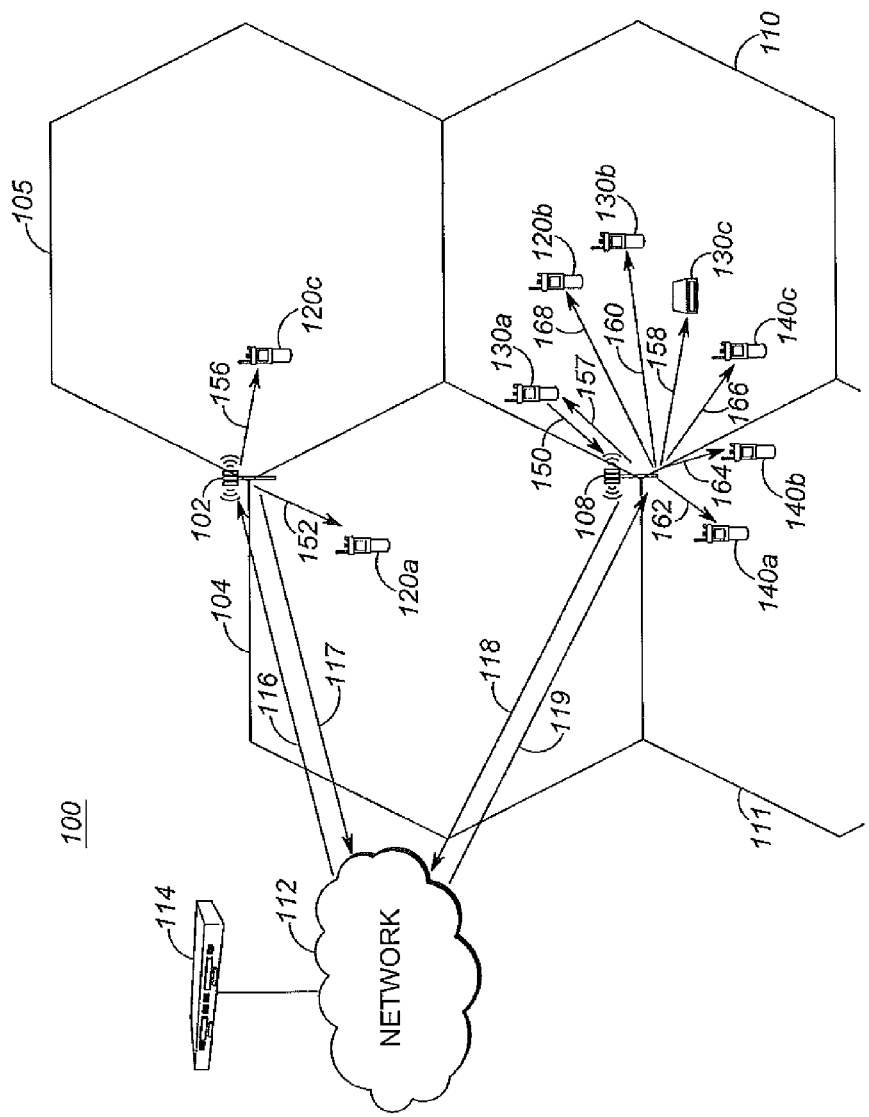
FIG. 2 is another schematic diagram of a conventional broadband radio access network illustrating an example scenario in which embodiments of the present disclosure may be desirable or applicable.
Figure 3A:
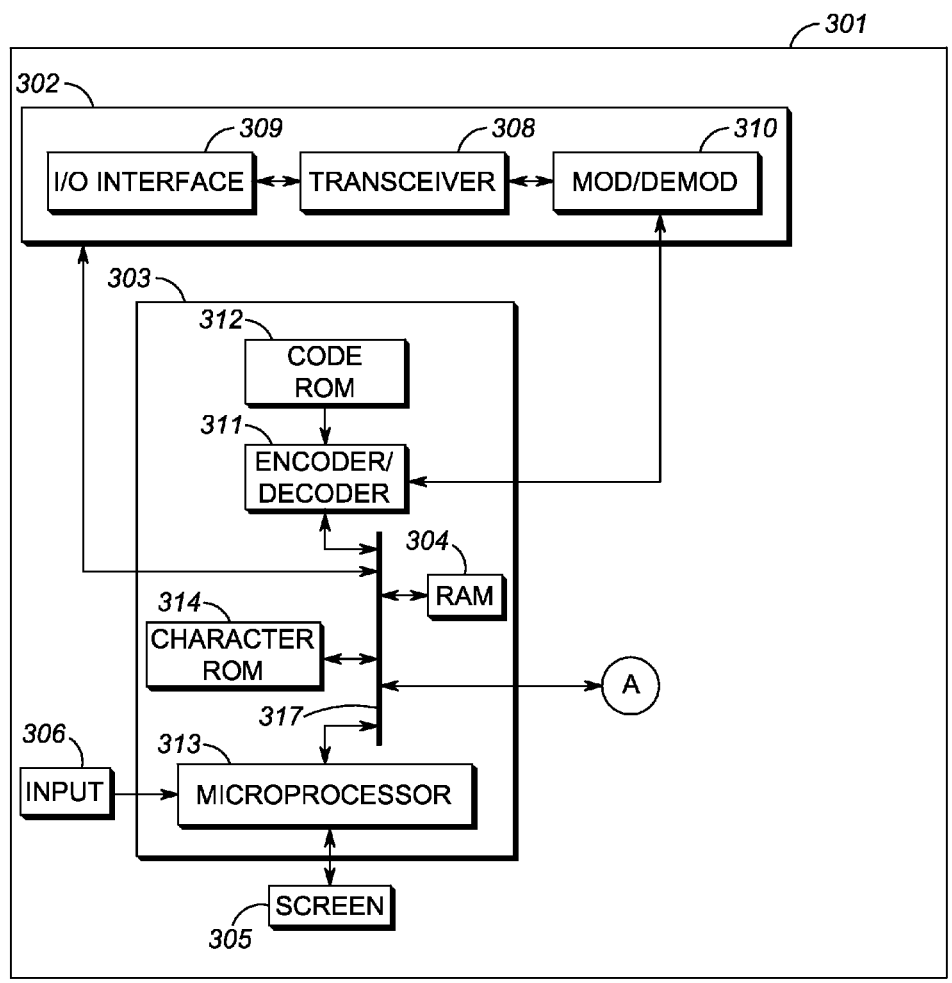
FIGS. 3A and 3B are block diagrams of an infrastructure device capable of communicating with the broadband radio access network of FIGS. 1 and 2 to improve efficiency of group calls over broadband radio access networks in accordance with embodiments of the present disclosure.
Figure 3B:
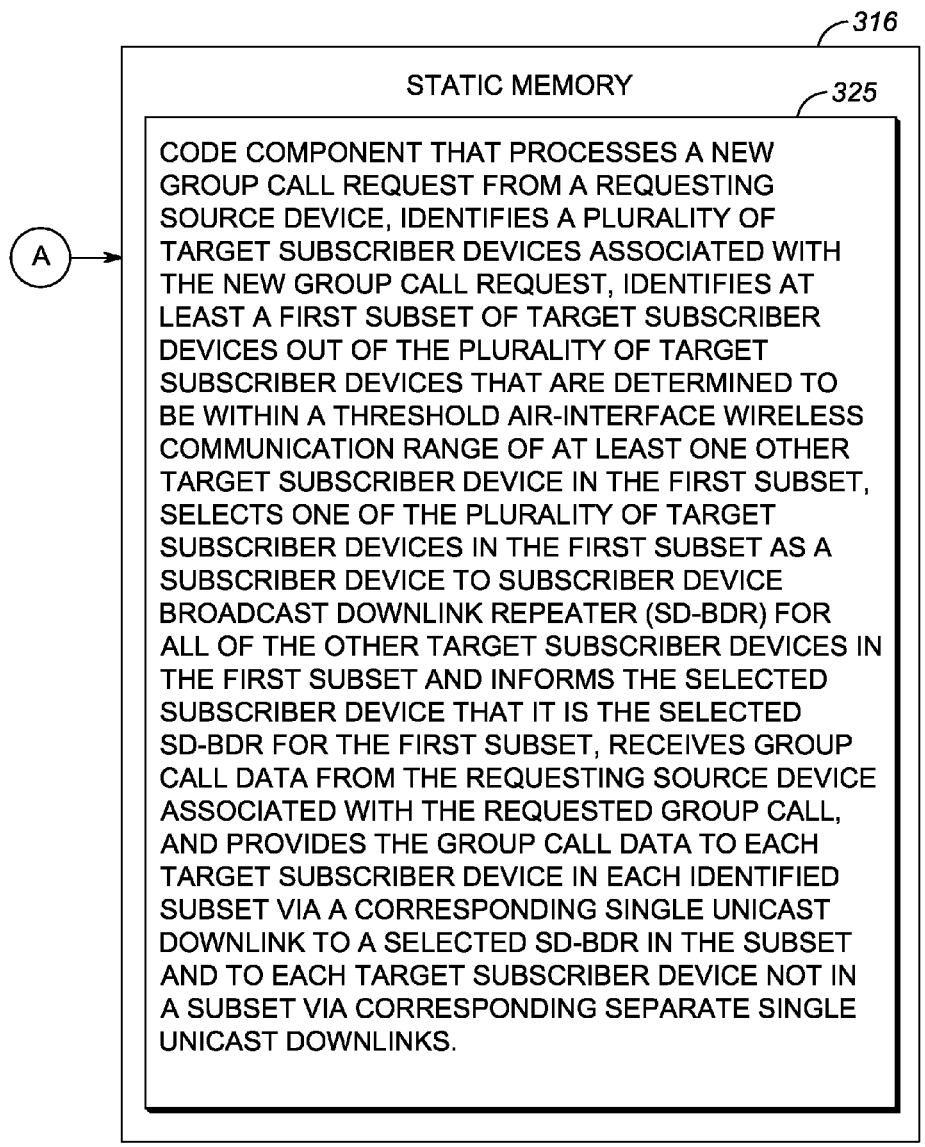
Figure 5:
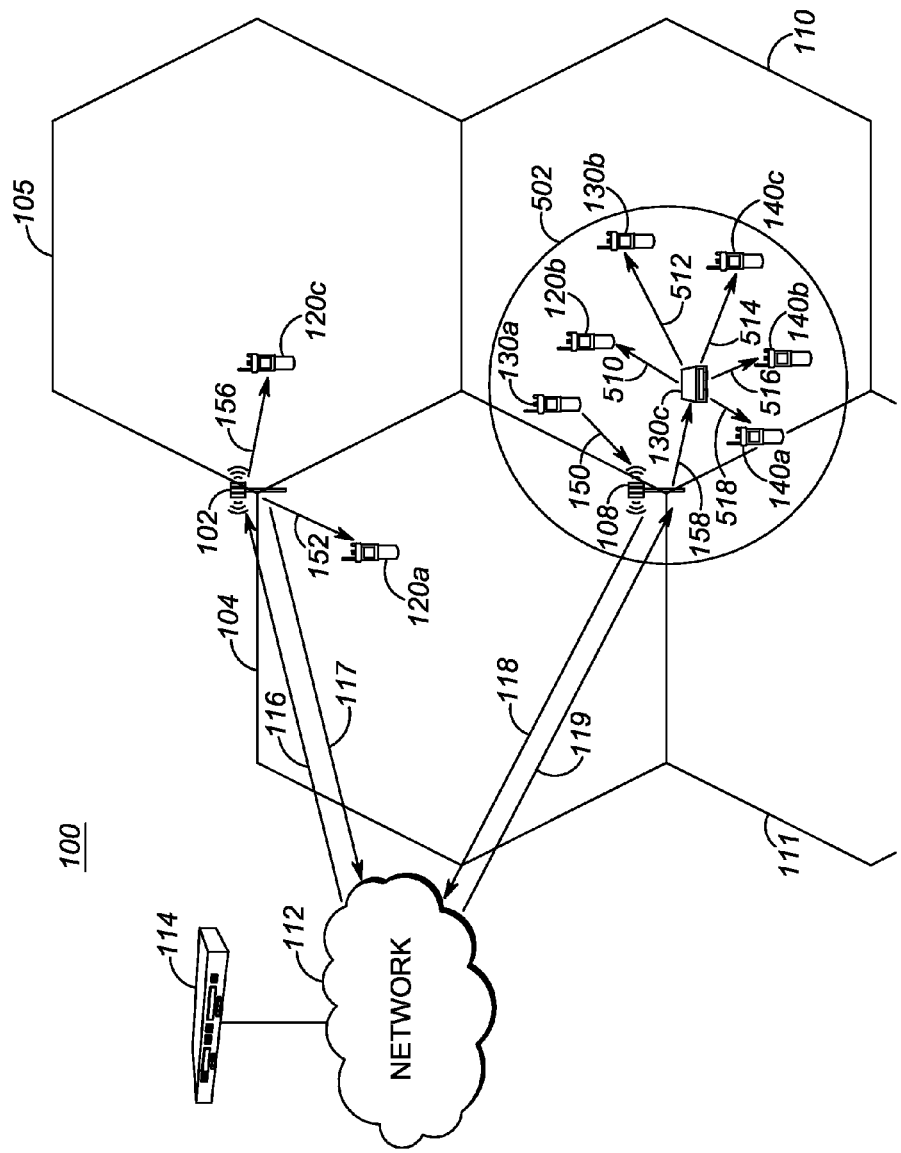
FIG. 5 is a schematic diagram of an improved broadband radio access network operating consistent with embodiments of the present disclosure.

FIGS. 3A and 3B are example functional block diagrams of a network infrastructure device (NID) 301, such as call controller 114, operating outside of or within network 112 of FIG. 2, in accordance with some embodiments. Although the examples in FIGS. 1-2 and 5 illustrate an NID 301 (call controller 114) outside of network 112 supporting group calls across two fixed nodes 102, 108 communicatively coupled and supported via the network 112 and using a same technology (LTE), in other embodiments (not shown), the NID 301 (call controller 114 of FIG. 5) may be coupled to additional fixed nodes supported by a different network separate from network 112, and perhaps supporting fixed nodes operating in accordance with a different broadband RAN protocol than that used at fixed nodes 102, 108, and may support group calls across the different broadband RANs using a standard IP protocol interface with the separate supporting networks, for example. Other possibilities exist as well.

As shown in FIG. 3A, NID 301 includes a communications unit 302 coupled to a common data and address bus 317 of a processing unit 303. The NID 301 may also include an input unit (e.g., keypad, pointing device, etc.) 306 and a display screen 305, each coupled to be in communication with the processing unit 303.

The processing unit 303 may include an encoder/decoder 311 with an associated code Read Only Memory (ROM) 312 for storing data for encoding and decoding voice, data, control, or other signals that may be transmitted or received between BSs, eNodeBs, subscriber devices, or other devices in one or more broadband RANs such as broadband RAN 100 illustrated in FIG. 2. The processing unit 303 may further include a microprocessor 313 coupled, by the common data and address bus 317, to the encoder/decoder 311, a character ROM 314, a Random Access Memory (RAM) 304, and a static memory 316 (FIG. 3B).

The communications unit 302 may include one or more wired or wireless input/output (I/O) interfaces 309 that are configurable to communicate with BSs, eNodeBs, subscriber devices, or other devices in one or more broadband RANs. The communications unit 302 may include one or more wireless transceivers 308, such as an LTE transceiver, a Bluetooth transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, and/or other similar type of wireless transceiver configurable to communicate via a wireless network such as network 112. The communications unit 302 may alternatively or additionally include one or more wireline transceivers 308, such as an Ethernet transceiver, a Universal Serial Bus (USB) transceiver, or similar transceiver configurable to communicate via a twisted pair wire, a coaxial cable, a fiber-optic link or a similar physical connection to a wireline network such as network 112. The transceiver 308 is also coupled to a combined modulator/demodulator 310 that is coupled to the encoder/decoder 311.

The microprocessor 313 has ports for coupling to the input unit 306 and to the display screen 305. The character ROM 314 stores code for decoding or encoding data such as control, instruction, or request messages, call reception information messages, communication range request and response messages, and/or data or voice messages that may be transmitted or received by the NID 301. Static memory 316 (FIG. 3B) may store operating code 325 for the microprocessor 313 that, when executed, processes a new group call request from a requesting source device, identifies a plurality of target subscriber devices associated with the new group call request, identifies at least a first subset of target subscriber devices out of the plurality of target subscriber devices that are determined to be within a threshold air-interface downlink wireless communication range of at least one other target subscriber device in the first subset, selects one of the plurality of target subscriber devices in the first subset as a subscriber device to subscriber device broadcast downlink repeater (SD-BDR) for all of the other target subscriber devices in the first subset and informs the selected subscriber device that it is the selected SD-BDR for the first subset, receives group call data from the requesting source device associated with the requested group call, and provides the group call data to each target subscriber device in each identified subset via a corresponding single unicast downlink to a selected SD-BDR in the subset and to each target subscriber device not in a subset via corresponding separate single unicast downlinks, in accordance with one or more steps and/or message transmissions or receptions as set forth in FIGS. 6A-6C and its corresponding text. Static memory 316 may comprise, for example, a hard-disk drive (HDD), an optical disk drives such as a compact disk (CD) drive or digital versatile disk (DVD) drive, a solid state drive (SSD), a tape drive, a flash memory drive, or a tape drive, to name a few.

Figure 4A:
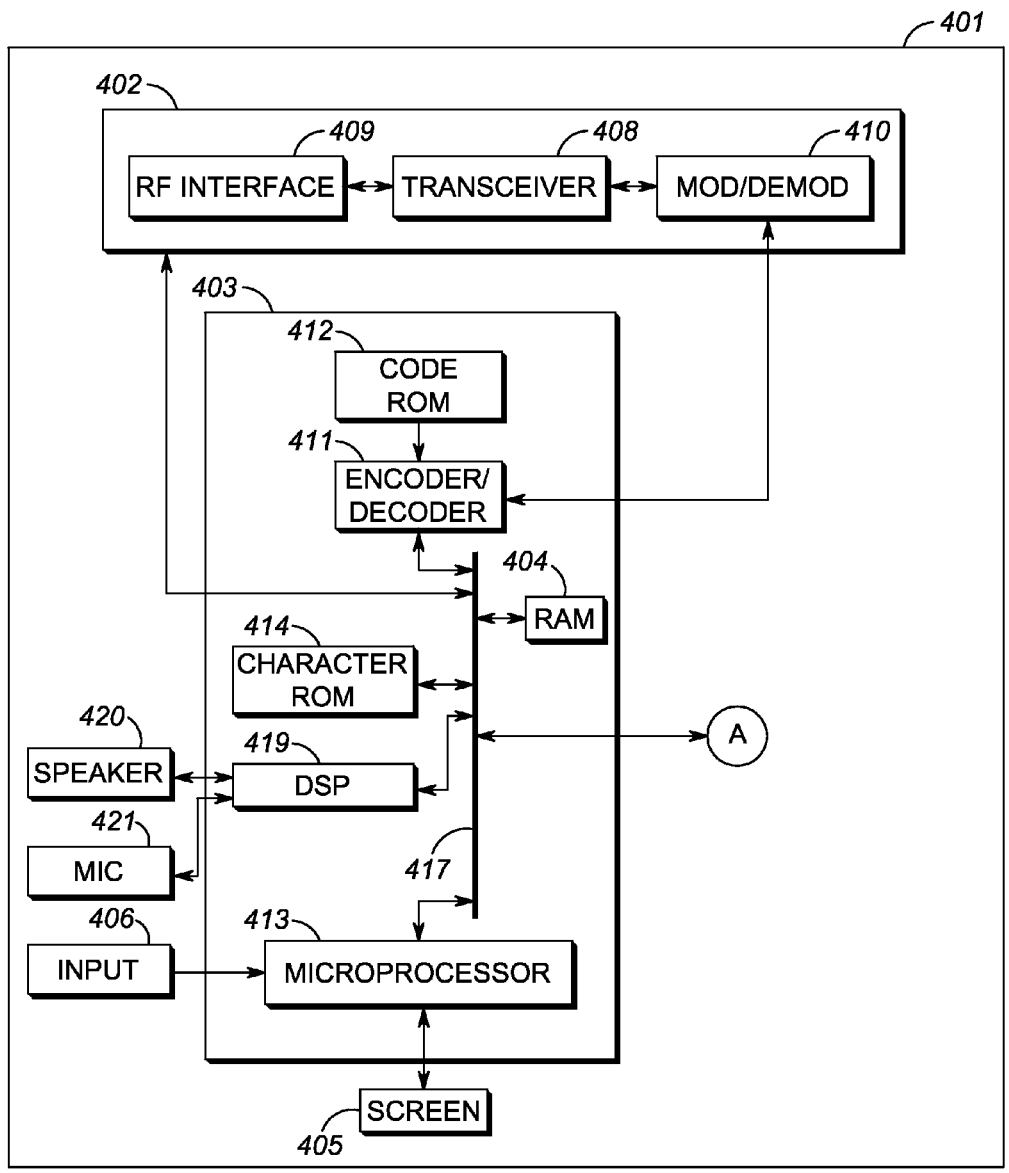
FIGS. 4A and 4B are block diagrams of an illustrative layout of a subscriber device capable of operating as a subscriber device to subscriber device broadcast downlink repeater in accordance with embodiments of the present disclosure.
Figure 4B:
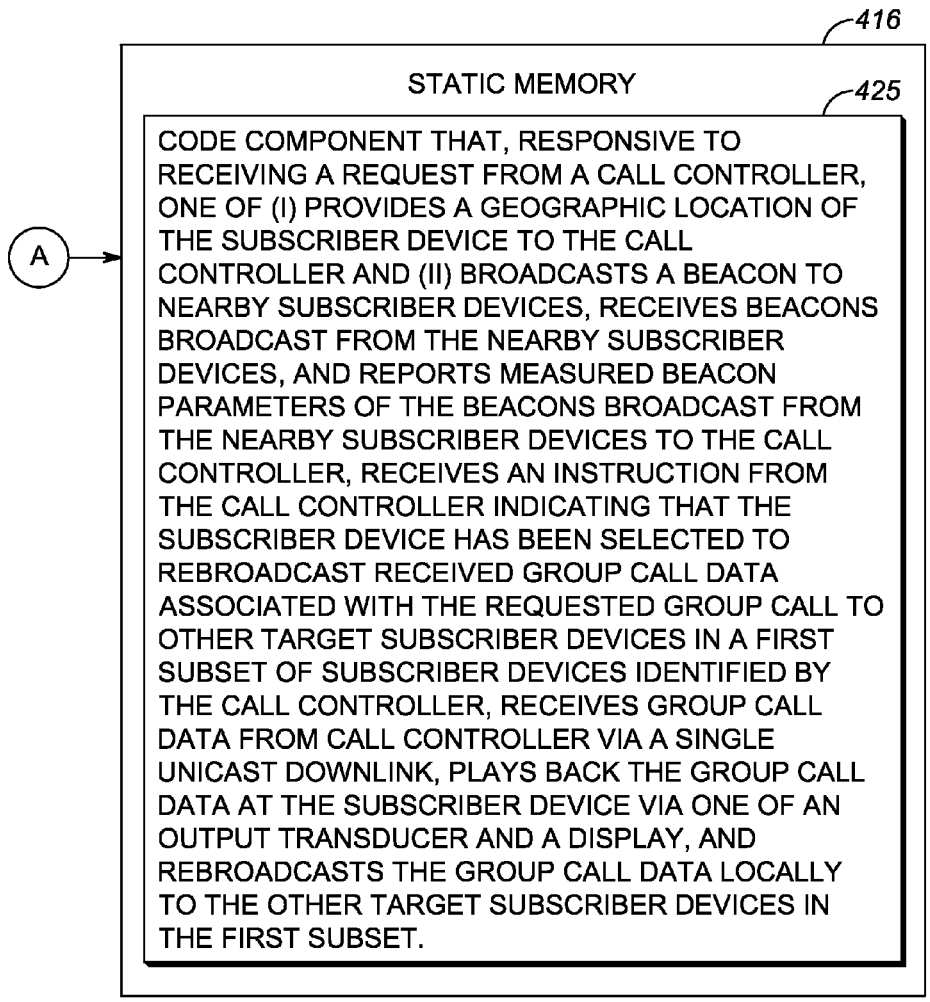

FIGS. 4A-4B are example functional block diagrams of a subscriber device 401 such as vehicular radio subscriber device 130c of FIG. 2 that may operate in the broadband RAN 100. Other subscriber devices may contain same or similar structures. As shown in FIG. 4A, subscriber device 401 includes a communications unit 402 coupled to a common data and address bus 417 of a processing unit 403. The subscriber device 401 may also include an input unit (e.g., keypad, pointing device, etc.) 406, an output transducer unit (e.g., speaker) 420, an input transducer unit (e.g., a microphone) 421, and a display screen 405, each coupled to be in communication with the processing unit 403.

The processing unit 403 may include an encoder/decoder 411 with an associated code ROM 412 for storing data for encoding and decoding voice, data, control, or other signals that may be transmitted or received between BSs, eNodeBs, or other subscriber devices in the same radio site as subscriber device 401. The processing unit 403 may further include a microprocessor 413 coupled, by the common data and address bus 417, to the encoder/decoder 411, a character ROM 414, a RAM 404, and a static memory 416 (FIG. 4B). The processing unit 403 may also include a digital signal processor (DSP) 419, coupled to the speaker 420, the microphone 421, and the common data and address bus 417, for operating on audio signals received from one or more of the communications unit 402, the static memory 416, and the microphone 421.

The communications unit 402 may include an RF interface 409 configurable to communicate with other subscriber devices within its communication range and with BSs, access points, eNodeBs, and other infrastructure devices within its communication range. The communications unit 402 may include one or more broadband wireless transceivers 408, such as an LTE transceiver, a 3G (3GGP or 3GGP2) transceiver, a WiMAX transceiver perhaps operating in accordance with an IEEE 802.16 standard, and/or other similar type of wireless transceiver configurable to communicate via a wireless network, for infrastructure communications. In addition, communication unit 402 may include one or more second narrowband radio transceivers such as an APCO P25 transceiver, a DMR transceiver, a TETRA transceiver, or one or more second local area network or personal area network transceivers such as Wi-Fi transceiver perhaps operating in accordance with an IEEE 802.11 standard (e.g., 802.11a, 802.11b, 802.11g) or a Bluetooth transceiver, for subscriber device to subscriber device communications. For example, the communications unit 402 may include both an LTE-based transceiver and a DMR-based transceiver, among other combinations of multiple transceivers. The transceiver 408 is also coupled to a combined modulator/demodulator 410 that is coupled to the encoder/decoder 411. The character ROM 414 stores code for decoding or encoding data such as control, request, or instruction messages, call reception information messages, communication range request and response messages, and/or data or voice messages that may be transmitted or received by the subscriber device 401.

Figure 6A:
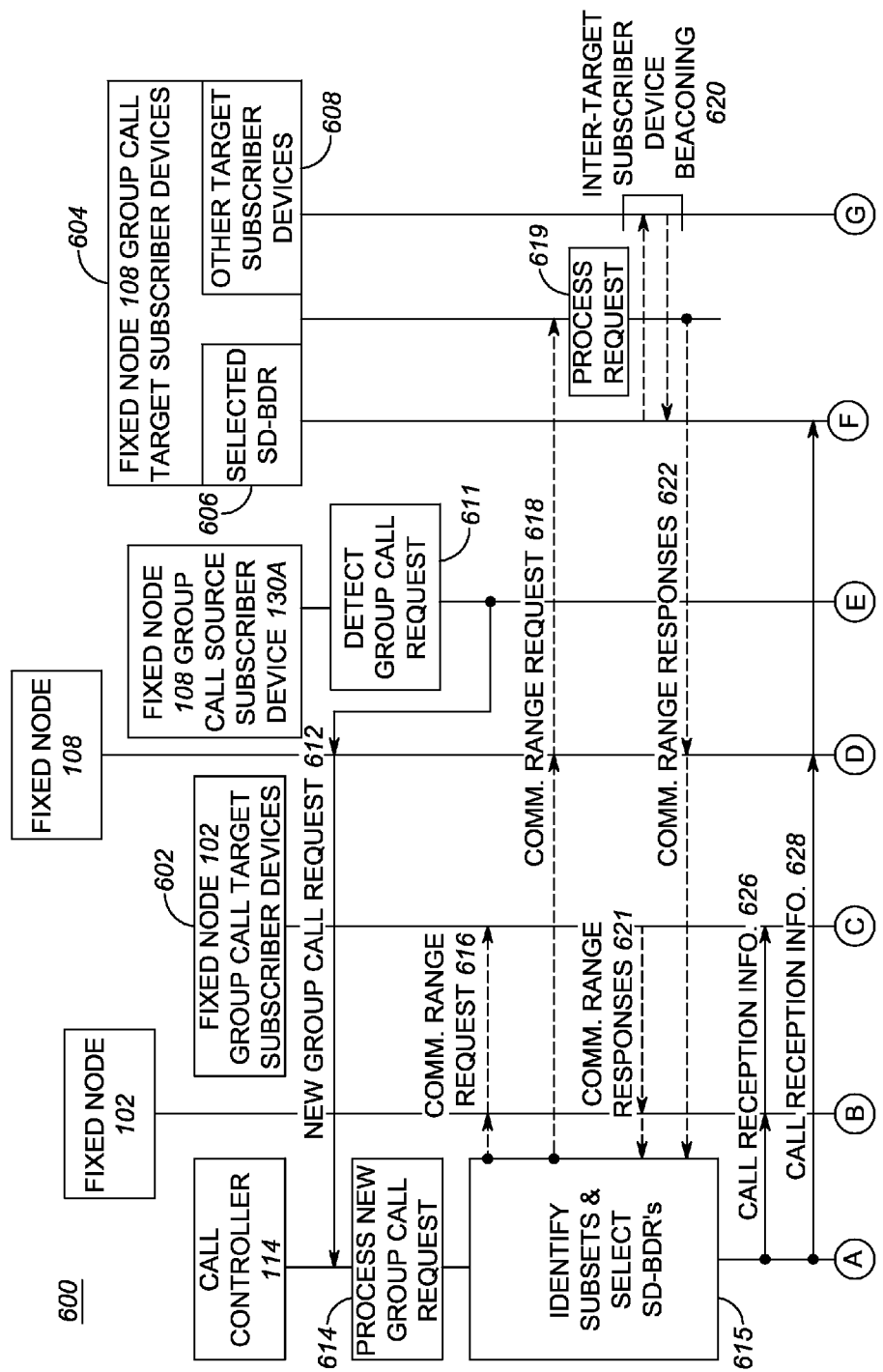
FIGS. 6A-6C include a message flow diagram illustrating processing steps and message flows between broadband radio access network devices and subscriber devices of FIG. 5 in accordance with embodiments of the present disclosure.
Figure 6B:
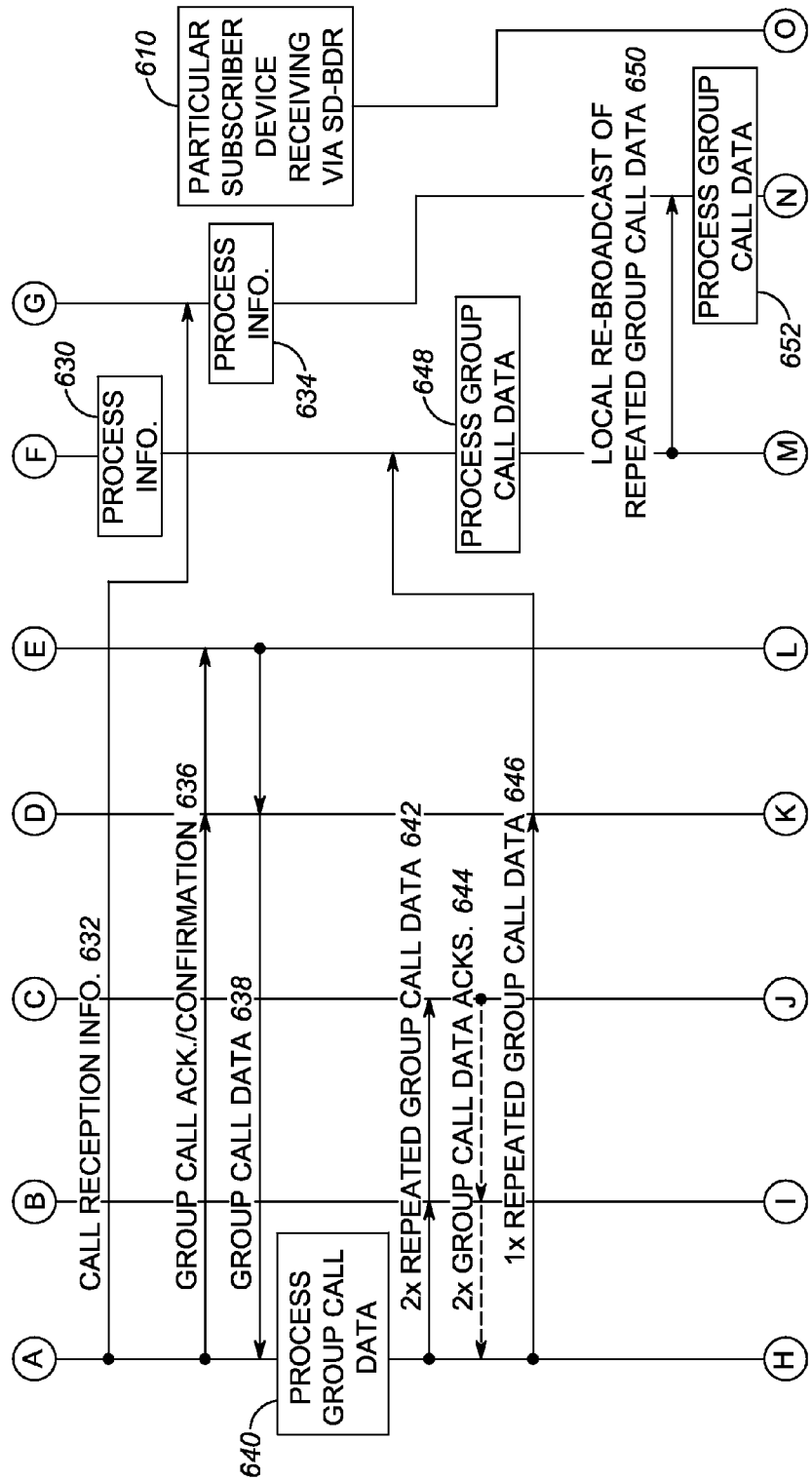
Figure 6C:
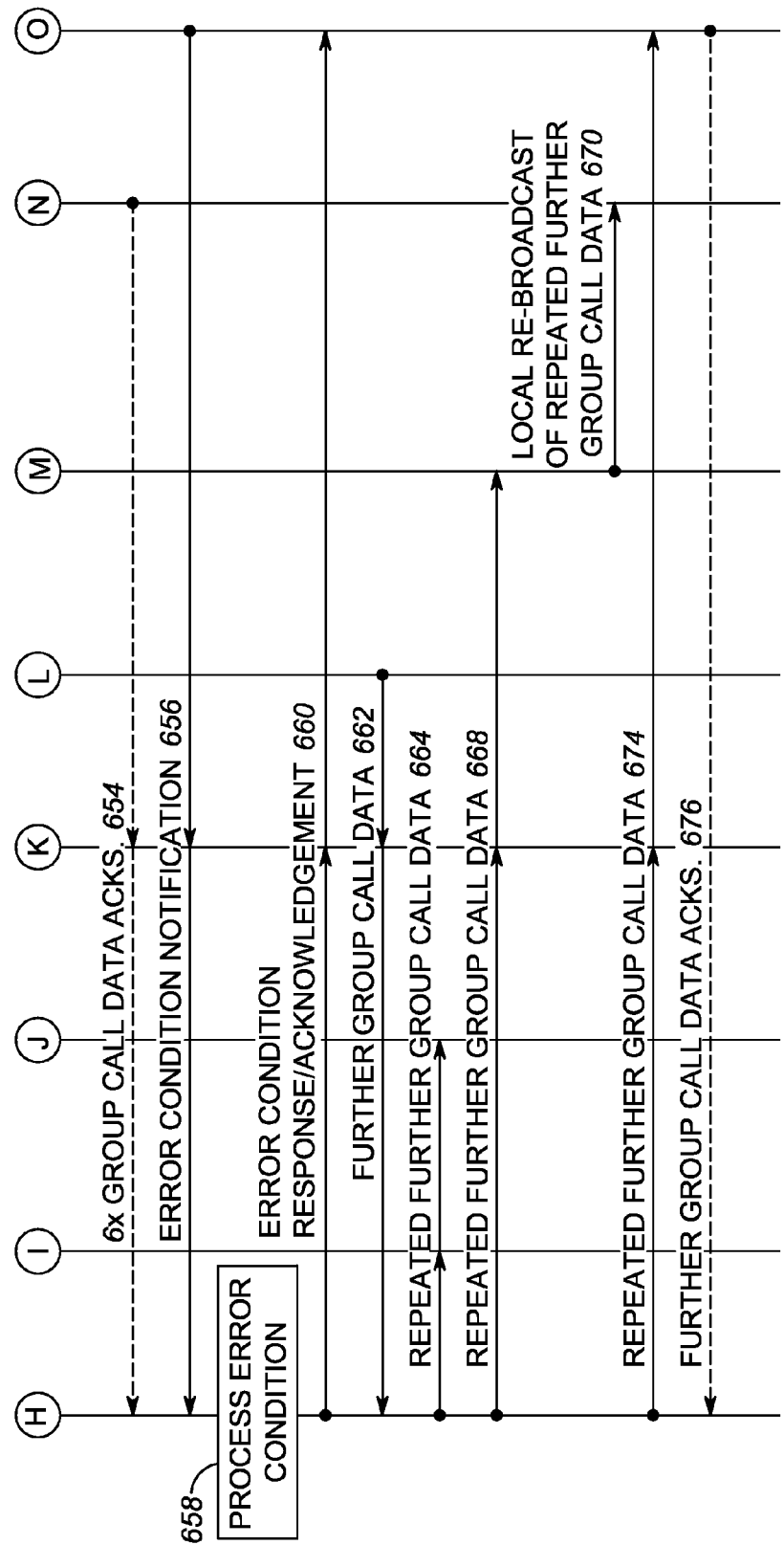

Static memory 416 (FIG. 4B) may store operating code 425 for the microprocessor 413 that, when executed, causes the subscriber device 401, responsive to receiving a request from a call controller, to one of (i) provide a geographic location of the subscriber device to the call controller and (ii) broadcast a beacon to nearby subscriber devices, receive beacons broadcast from the nearby subscriber devices, and report measured beacon parameters of the beacons broadcast from the nearby subscriber devices to the call controller, receive an instruction from the call controller indicating that the subscriber device has been selected to rebroadcast received group call data associated with the requested group call to other target subscriber devices in a first subset of subscriber devices identified by the call controller, receive group call data from call controller via a single unicast downlink, play back the group call data at the subscriber device via one of an output transducer and a display, and rebroadcast the group call data locally to the other target subscriber devices in the first subset, in accordance with one or more steps and/or message transmissions or receptions as set forth in FIGS. 6A-6C and its corresponding text. Static memory 416 may comprise, for example, a HDD, an optical disk drives such as a CD drive or DVD drive, a SSD, a tape drive, a flash memory drive, or a tape drive, to name a few.

II. Consolidated Downlink Group Call Process Flows

FIGS. 5 and 6A-6C illustrate a network state and process flow, respectively, for achieving more efficient use of the broadband RAN downlink resources of FIG. 2. While reference numbers are continued from FIG. 2 to FIGS. 5 and 6 for ease of reference, it is to be understood that the devices in FIGS. 5 and 6 have been modified consistent with this disclosure to provide additional functions and features of a modified call controller and a modified subscriber device. For example, call controller 114 of FIG. 5 may be, for example the NID 301 of FIGS. 3A-3B, and subscriber device 130c may be, for example, the subscriber device 401 of FIGS. 4A-4B. Furthermore, while FIG. 5 continues the example of FIG. 1 with respect to an example LTE implementation, FIGS. 5 and 6 are not restricted to an LTE infrastructure and/or protocol, and other types of broadband RANs and other architecture devices and network architectures could be implemented instead of or in addition to that illustrated in FIGS. 5 and 6A-6C.

FIGS. 6A-6C set forth a message flow diagram that will describe the transformation from the conventional broadband network state for a group call as set forth in FIG. 2, to an enhanced network state for a group call consistent with this disclosure as set forth in FIG. 5.

More specifically, FIGS. 6A-6C illustrate message flows and processing steps between the call controller 114, the fixed node 102 (serving RF sites 104, 105), target subscriber devices 602 of fixed node 102 (e.g., subscriber devices 120a and 120c in FIG. 5), fixed node 108, the group call source subscriber device 130a at fixed node 108 (serving RF sites 104, 110, and 111), and target subscriber devices 604 of fixed node 108 (e.g., subscriber devices 120b, 130b, 130c, 140a, 140b, and 140c). Sub-groups included within the subscriber devices 604, including a selected subscriber device to subscriber device broadcast downlink repeater (SD-BDR) 606, subscriber devices 608 selected to receive the group call via the SD-BDR, and a particular subscriber device 610 (FIG. 6B) previously receiving via the SD-BDR but experiencing an error condition, will be described in the following paragraphs in turn.

At step 611 in FIG. 6A, the requesting source subscriber device 130a detects a user request to initiate a new group call. For example, source subscriber device 130a may have a group call rotary dial input that allows the user to select a second group as a target group for the group call, and may have a push to talk (PTT) button that allows the user to indicate that he or she wishes to start the new group call to the target group (e.g., perhaps both inputs received via input 406 illustrated in FIGS. 4A-4B). Responsive to detecting the user input, the source subscriber device 130a generates and transmits, via a broadband transceiver (such as transceiver 408 as illustrated in FIGS. 4A-4B), a new group call request 612 to call controller 114 via its serving fixed node 108. Of course, in other embodiments, the group call may be initiated by other devices in broadband RAN 100 including, but not limited to, a dispatch console within or communicatively coupled to network 112 or call controller 114 and an inter-RF subsystem interface (ISSI) gateway within or communicatively coupled to network 112 or call controller 114.

At step 614, the call controller 114 receives and processes the new group call request. The call controller 114 may first access a data store at the call controller or at another accessible device that maps a group identified in the new group call request 612 to a number of target subscriber devices that are subscribed to the second group, and perhaps also access current fixed node information for each target subscriber device in the group. For example, the call controller 114, receiving the new group call request from the source subscriber device 130a, may identify target subscriber devices to include subscriber devices 120a and 120c at fixed node 102, and subscriber devices 120b, 130b, 130c, 140a, 140b, and 140c at fixed node 108. Further, the data store may provide call controller 114 with additional information regarding each subscriber device in the group, including but not limited to one or more of a type of subscriber device (personal or vehicular, for example), an energy source for each subscriber device (DC, AC, battery storage capabilities, etc.), a preconfigured preference or priority for each subscriber device to act as an SD-BDR, frequencies and/or communication protocols supported, and an average or expected communication range and/or transmission power level for each subscriber device.

At step 615, the call controller 114 identifies target subscriber devices participating in the group call that can be consolidated together in a subset and assigned a single consolidated unicast downlink and, for each subset identified, selects an SD-BDR for the subset to rebroadcast group call data to the other target subscriber devices in the subset. The call controller 114 first determines what method to use in identifying active subscriber devices in the subscribed group that can be consolidated into a subset on a single downlink in order to deliver group call information more efficiently. For example, the data store may indicate, on a per group basis or on a global basis, or the new group call request 612 itself may indicate, a method to be used for consolidating the subscriber devices in the group.

For example, in one method, target subscriber devices may be polled by the call controller 114 in response to the new group call request 612 to provide (or may automatically periodically or intermittently provide to the call controller 114) location information obtained via GPS, triangulation, or some other method, that can then be used by the call controller 114 to determine subsets and select an SD-BDR. In another method, subscriber devices may be instructed to transmit polling beacons to one another at an identified schedule and report back to the call controller 114 measured attributes of the polling signals that each subscriber device received (or did not receive), such as signal to noise ratios (SNR) or signal strengths (dB), among other attributes, that can then be used by the call controller 114 to determine subsets and select an SD-BDR. Other methods could be used as well.

More specifically, and as illustrated in FIG. 6A, at step 615, the call controller may obtain communication range information from target subscriber devices by transmitting a communication range request 616 to group call target subscriber devices 602, via fixed node 102, and transmitting a communication range request 618 to group call target subscriber devices 604, via fixed node 108. At step 619, the target subscriber devices 604 process the communication range request 618. In one embodiment in which the communication range request 618 is a request for location, each target subscriber device 604 may provide its current location (determined, perhaps, via a GPS device or a triangulation process with one or more fixed nodes, among other possibilities) and provides its current location back to call controller 114 in communication range responses 622.

In another embodiment in which the communication range request 618 is an instruction for the target subscriber devices 604 to transmit beacons to one another at a schedule indicated in the request 618, and as illustrated as inter-device beaconing 620 in FIG. 6A, each subscriber device in the group of target subscriber devices 604 transmits a beacon at its scheduled time, and each of the other subscriber devices in the group of target subscriber devices 604 listens for the beacon, measures one or more attributes of the received signal (or notes its failure to receive), and aggregates the information and transmits it to the call controller 114 as communication range responses 622. In other embodiments, only one or more target subscriber devices 604 in the group transmit the beacon at scheduled times in order to reduce call setup time. The subscriber devices 604 chosen to transmit the beacon may be specified in the communication range request 618, and may be chosen by the call controller 114 as those subscriber devices most likely to be selected as the SD-BDR for the group (e.g., based on information noted above relating to battery, transmission range, or subscriber device type.

Each communication range request 618 is transmitted via a separate unicast transmission from call controller 114 via network 112 and downlink backhaul 119 to fixed node 108 and over separate unicast air interface downlinks (157-168 in FIG. 2) from fixed node 108 to target subscriber devices 604. Each communication range response 622 is transmitted via a separate unicast uplink over the air interface to fixed node 108 (not illustrated in FIG. 2), and separate unicast transmissions from fixed node 108 to call controller 114 via uplink backhaul 118 and network 112.

Although not separately illustrated in FIG. 6A, target subscriber devices 602 may perform same or similar functions, and similarly transmit communication range responses 621 back to the call controller 114 via separate unicast uplinks.

Once the call controller 114 has received the location and/or beacon measurement information in the communication range responses 621 and 622, it can use the information, perhaps along with the aid of the additional subscriber device information stored at the call controller 114, such as type of subscriber device and average or expected communication range, to identify subsets of target subscriber devices that can be consolidated together in a subset and assigned a single consolidated unicast downlink and, for each subset identified, to select an SD-BDR for the subset. The call controller 114 may iterate through each of the target subscriber devices 604 and determine, based on all of the information it has, how many other target subscriber devices could be reached via a rebroadcast of group call data from that target subscriber device. In some embodiments, if none of the target subscriber devices 604 could reach more than a threshold minimum number of other target subscriber devices, the call controller 114 may refrain from consolidating target subscriber devices into subsets and instead simply unicast the group call data to each target subscriber device. The minimum threshold number of other target subscriber devices may be, for example, 5, 10, 25, or 100.

For example, in an embodiment in which GPS location information is provided to call controller 114 in communication range responses 622, the call controller may apply a default range threshold (e.g., range 502 in FIG. 5 of, for example, 0.1, 1, 3, 5, or 10 miles and may be indicative of an average, minimum, or maximum downlink communication range of the target subscriber devices, each a candidate SD-BDR, in the group) and identify a geographic positioning of that range so as to include a maximum or threshold number of target subscriber devices within that range (e.g., radios 120b, 130b, 140a, 140b, and 140c given the range 502 in FIG. 5) to identify a subset. The call controller 114 may then access its data store and determine, based on subscriber device type, preference, priority, or some other information, a best subscriber device to select as an SD-BDR that falls within the geographic range. For example, in FIG. 5, the call controller 114, after identifying the geographic positioning of the range 502 as illustrated to encompass a maximum number of subscriber devices, may determine that the vehicular subscriber device 130c is the best candidate to act as an SD-BDR for the subset based on its increased transmission power relative to the other target subscriber devices in the subset. Of course, other attributes could be used to select the SD-BDR, available at the call controller 114 or a from a remote computing device or from the target subscriber devices themselves, such as current battery capacity, maximum battery capacity, AC/DC power source type, transmission power, topography of subscriber device locations (e.g., preferring a subscriber device at a highest elevation or one away from tall buildings or other structures), frequencies and/or communication protocols supported, and other types of information.

In other embodiments, the call controller 114 may iterate through each target subscriber device (e.g., candidate SD-BDR) in the group and apply a variable range threshold based on the different types of subscriber devices and their respective transmission ranges (e.g., minimum, maximum, average, etc., and perhaps stored in the data store at the call controller 114 or accessible at a remote computer device), and identify an optimal subscriber device to act as an SD-BDR as the device that provides a transmission range that encompasses a maximum or threshold number of target subscriber radios within that range, based on each device's location. If the threshold is applied and more than one subscriber device reaches or exceeds the threshold (e.g., 5, 10, 50, or 100), the call controller 114 may then select the target subscriber device that reaches the highest number of subscriber devices, randomly or pseudo-randomly select one of the target subscriber devices meeting the threshold, or use some other information such as priority or preference information to select one of the target subscriber devices meeting the threshold to act as the SD-BDR. In other embodiments, the call controller 114 may arbitrarily or randomly select one of the target subscriber devices in the identified subset to act as the SD-BDR for the subset.

In a further example, and in an embodiment in which beacon measurement information is provided to call controller 114 in communication range responses 622, the call controller 114 may determine which target subscriber device provided a beacon that was heard at an acceptable level by a highest or threshold number of other target subscriber devices. An acceptable level may be a minimum acceptable signal to noise ratio, such as in the range of between 10-15 dB. If the threshold number of subscriber devices is applied and more than one subscriber device reaches or exceeds the threshold (e.g., 5, 10, 50, or 100), the call controller 114 may then, again, select the target subscriber device that reaches the highest number of subscriber devices, randomly or pseudo-randomly select one of the target subscriber devices meeting the threshold, or use some other information such as priority or preference information to select one of the target subscriber devices meeting the threshold to act as the SD-BDR. The target subscriber device that was heard by a highest or selected as meeting the threshold is selected as the SD-BDR for the corresponding subset of other target subscriber devices that reported that they can receive the beacon from the selected SD-BDR at an acceptable level. In other embodiments, the call controller 114 may arbitrarily or randomly select one of the target subscriber devices in the identified subset that meets the threshold to act as the SD-BDR for the subset. Because this method relies on actual reception instead of an anticipated or average communication range, a geographic range of the subset accordingly to this method will likely be irregularly shaped and different than that illustrated in FIG. 5.

If a target subscriber device is not selected or identified as within a subset for downlink consolidation, it is assigned its own separate unicast downlink (e.g., downlink transmission over downlink backhauls 116/119 and downlink air-interface links over air interface downlinks 152-168 in FIG. 2) for the group call.

For exemplary purposes only, it is assumed going forward that the call controller 114 identified target subscriber devices within the range 502 of FIG. 5 (including target subscriber devices 120b, 130b, 140a, 140b, and 140c) as members of a subset for consolidating group call downlinks, and determined that target subscriber devices 120a and 120c should not be grouped together into another subset and instead should be assigned separate unicast downlinks for the group call (perhaps due to failing to meet a threshold minimum number of subscriber devices to make forming a subset worthwhile, or perhaps due to a determination that subscriber devices 120a and 120c are not within sufficient range of one another, among other possible reasons). Furthermore, it is assumed that the call controller 114 selected vehicular subscriber device 130c as the SD-BDR for the subset, perhaps due to its increased communication range or battery characteristics compared to the other target subscriber devices in the subset.

In one embodiment, the call controller 114 may continuously and/or periodically execute step 615, even before new group call request 612 is received, perhaps including periodically transmitting communication range requests to all active subscriber devices, such that upon receipt of a new call request such as new group call request 612, the call controller 114 can immediately proceed to transmit call reception information without any intervening, time consuming steps for determining subscriber device location and/or communication range, as set forth above.

After the call controller 114 has identified each subset of target subscriber devices for the call, and elected an SD-BDR for each subset, in one embodiment, it notifies each of the target subscriber devices of how it will receive the group call. For example, the call controller transmits a call reception information message 626 to target subscriber devices 602 via fixed node 102 informing the target subscriber devices 602 (e.g., target subscriber devices 120a and 120c in FIG. 5) that they will receive a new group call (for a group that they are currently subscribed to) via separate unicast downlinks including separate unicast transmissions over downlink backhaul 116 and separate air interface downlinks 152 and 156. For example, the call reception information message 626 may be a conventional new group call header, including perhaps a media burst granted (MB_Granted) message compliant with the Open Mobile Alliance (OMA) Push-to-talk Over Cellular (PoC) media burst control protocol (OMA POC v 2.1, OMA-TS-PoC_UserPlane-V2_1-20110802-A, August 2011).

Because target subscriber devices 604 have been consolidated into a subset, and a particular one of the target subscriber devices 604 elected to act as an SD-BDR 606, modified and different call reception information messages 628 and 632 are transmitted, respectively, from call controller 114 to the selected SD-BDR 606 and to the other subscriber devices 608 selected to receive the group call via the SD-BDR 606. The call reception information message 628 may be, for example, a modified new group call header that informs the selected SD-BDR 606 (e.g., vehicular subscriber device 130c in FIG. 5) that it has been selected as the SD-BDR for the subset and that subsequently received group call data should be rebroadcast to the other target subscriber devices on a local channel and/or frequency. The local channel and/or frequency may be identified in the message 628 itself, may be determined via a pre-configured setting at the SD-BDR 606, or may be negotiated by the SD-BDR with the other target subscriber devices in the subset, among other possibilities. For example, the channel may be identified as a frequency (FDMA), as a time slot on a particular frequency (TDMA), as a code on a particular frequency (CDMA), and/or in some other manner. At step 630, the selected SD-BDR 606 processes the call reception information message 628, and may verify the availability of the local channel for re-broadcast to the other target subscriber devices 608, perhaps via a carrier sense mechanism. If SD-BDR 606 determines that the local channel is not available, it may inform the call controller 114 of the unavailability, and may either select a new channel itself, or request that the call controller 114 select a new channel and provide the new channel information to itself and the other target subscriber devices 608.

At substantially the same time as the call reception information message 628 is transmitted, and as illustrated in FIG. 6B, the call controller 114 transmits call reception information message 632 to the other target subscriber devices 608 instructing the other target subscriber devices 608 that they will receive the new group call via SD-BDR 606 on a local channel and optionally identifies the channel to which the other subscriber devices 608 should tune to (e.g., away from the respective broadband RAN air interface downlinks over which they received the call reception information messages 632). At step 634, each of the other target subscriber devices 608 processes the call reception information message 632 and tunes to the local channel (pre-configured, indicated in the message 632, or negotiated with the SD-BDR 606), and prepares to receive the group call data. For example, a subscriber device such as that set forth in FIGS. 4A-4B may tune its narrowband or PAN transceiver to the local channel, while either maintaining its previous broadband transceiver in a connected state (uplink and/or downlink) or powering down its broadband transceiver until the broadband connection is needed again. In some embodiments, each of the other target subscriber devices 608 may maintain their separate air interface uplinks with the call controller 114 via their serving fixed node (108 in FIG. 5) in the broadband RAN in order to provide group call data acknowledgments and/or feedback regarding their ability to receive the new group call data now and in the future via SD-BDR 606. In some embodiments in which it is determined that it is not necessary to acknowledge the group call data received via the SD-BDR, the other target subscriber devices 608 may be configured to not maintain the separate air-interface uplinks with their serving fixed node in the broadband RAN and instead entirely detach from the broadband RAN 100 of FIG. 5 and power down the broadband transceiver in order to reduce resource usage over the air, at the subscriber device, and at the fixed node.

Call controller 114 then transmits a group call acknowledgment/confirmation message 636 to source subscriber device 130a via fixed node 108, indicating that it is ready to begin the group call. Subsequently, source subscriber device 130a begins transmitting group call data 638 on a continuous, periodic, or intermittent basis, dependent upon user input, to call controller 114. At step 640, call controller 114 processes the group call data and determines, based on the determinations made at step 615, how the group call data should be further distributed to the target subscriber devices in the second subset. For example, for each target subscriber device of the group call that is not in a subset, a separate transmission is made of duplicated group call data to each corresponding target subscriber device. This transmission is illustrated in repeated group call data 642, transmitted to target subscriber devices 602 via two separate downlink transmissions over, for example, downlink backhaul 116 and two separate air-interface downlinks 152 and 156 to target subscriber devices 120a and 120b at fixed node 102 of FIG. 5. In an embodiment in which group call data acknowledgments are provided back to the call controller 114, optional group call data acknowledgments 644 are provided back to call controller 114 over, for example, two separate air-interface uplinks (not shown in FIG. 5) and two separate transmissions over uplink backhaul 117 of FIG. 5.

At substantially a same time, for example, for each subset of target subscriber devices identified in step 615, a single separate transmission is made of duplicated group call data to each corresponding selected SD-BDR of each subset for re-broadcast to the other target subscriber devices in the subset. This transmission is illustrated in repeated group call data 646, transmitted directly to SD-BDR 606 (e.g., vehicular subscriber device 130c of FIG. 5) via a single downlink transmission over downlink backhaul 119 and a single separate air-interface downlink 158 to SD-BDR 606/vehicular subscriber device 130c at fixed node 108 of FIG. 5. At step 648, the SD-BDR 606 processes the group call data, including unmuting an output transducer such as speaker 420 and/or enabling a display screen such as screen 405 of subscriber device 401 in FIGS. 4A-4B to playback the group call data (which may include voice, audio, video, audio/video, etc.) and forwarding the group call data to a second transmitter or transceiver (narrowband or PAN transceiver 408 of FIGS. 4A-4B, for example) for local re-broadcast to the other target subscriber devices 608 on the local channel as local-rebroadcast of repeated group call data 650. The local rebroadcast of repeated group call data 650 may include same or similar information as the repeated group call data 646, such as subscriber device source identifier information and group identification information, among other information.

At step 652, each of the other target subscriber devices 608 process the group call data, including unmuting an output transducer such as speaker 420 and/or enabling a screen such as screen 405 of subscriber device 401 in FIGS. 4A-4B to playback the group call data. In a system in which group call data acknowledgment is enabled, each of the other target subscriber devices 608 and the SD-BDR 606 separately acknowledge receipt of the group call data via maintained separate air interface uplinks with fixed node 108 and via uplink backhaul 118 and network 112 to call controller 114, as illustrated in the six group call data acknowledgments 654 in FIG. 6C. Accordingly, the SD-BDR 606 refrains from forwarding any group call data acknowledgments on behalf of the target subscriber devices in the first subset. Of course, in other embodiments, the SD-BDR 606 may forward group call data acknowledgments on behalf of the target subscriber devices in the first subset (separately for each target subscriber device, or aggregated in a single "subset" acknowledgment packet). In one embodiment, no group call acknowledgments are provided separately via the broadband RAN 100 by each target subscriber device in the subset, however, negative acknowledgments are provided to the call controller 114 by target subscriber devices in the subset directly, via the broadband RAN 100, when the target subscriber devices do not receive call data within a specific preconfigured time interval.

In a normal group call, transmissions 638, 642, 646, and 650, and the optional acknowledgment transmissions, would continue until the group call ended, either through an express transmission of a call end header from source subscriber device 130a, or perhaps after the passage of a maximum call hangtime period during which no additional group call data is received from source subscriber device 130a. Once call controller 114 detects the end of the group call, and although not illustrated in FIG. 6C, call controller 114 may transmit separate call end instructions similar to the manner in which the repeated group call data 642 and 646 was transmitted, where the call end instruction causes target subscriber devices that had been receiving the group call via SD-BDR 606, such as the other target subscriber devices 608, to re-establish their prior separate uplink and downlink connections with the broadband RAN 100, and refrain from receiving further communications from the SD-BDR 606 (including, in some embodiments, powering down the transceiver that was being used to receive via the SD-BDR 606 or placing into a low-power standby mode). In other embodiments, and responsive to receiving the call end message, target subscriber devices that had been receiving the group call via the SD-BDR 606, such as the other target subscriber devices 608, may remain tuned to the local frequency and/or channel of the SD-BDR 606 for a predetermined period of time or until explicitly instructed to stop, so as to make subsequent responses or new group calls to the same group easier and quicker to setup. Other possibilities exist as well.

Of course, due to the mobility of the target subscriber devices, it is possible that one of the target subscriber devices in an identified subset may roam outside of the downlink wireless communication range of the subset's selected SD-BDR during an active group call. More specifically, returning to FIG. 6C and assuming that the group call has not ended yet, a particular target subscriber device 610 previously in the other target subscriber devices 608 group and receiving the group call via the SD-BDR 606, may roam outside of the communication range of the SD-BDR 606 (e.g., outside of the range 502 of FIG. 5, for example). In order to handle this possibility, the particular target subscriber device 610 may be configured to monitor the state of the incoming group call data and, when it is determined that it is no longer receiving a decodable signal from SD-BDR 606 and prior to receiving an explicit indication from call controller 114 or SD-BDR 606 that the group call is ending, transmit an error condition notification 656 to call controller 114 via its fixed node 108 and the separate air-interface uplink (not shown in FIG. 5) it has maintained with fixed node 108 and re-establish a separate air-interface downlink with fixed node 108. In other embodiments, the subscriber device 610 may be configured to monitor the strength of the signal and, in response to detecting that the signal strength has fallen below a preconfigured threshold level above but nearing a level that would render the signal undecodable, proactively notify the call controller 114 via error condition notification 656.

At step 658, the call controller 114 processes the error condition and modifies its stored distribution list for the group call so as to provide future group call data to the particular target subscriber device 610 via a new separate unicast downlink transmission over downlink backhaul 119 and a new (or previously established) separate unicast air-interface downlink between fixed node 108 and the particular target subscriber device 610. Call controller 114 may then provide an error condition response/acknowledgment message 660 to the particular target subscriber device 610 indicating that future group call data will be provided directly to the particular target subscriber device 610 via the separate downlink unicast air interface connection with the fixed node 108. For example, further group call data 662 received from source subscriber device 130a will be similarly repeated and provided to target subscriber devices 602 via repeated further group call data 664, will be similarly provided to the selected SD-BDR 606 via repeated further group call data 668 for subsequent local re-broadcast to the remaining ones of the other target subscriber devices 608 (e.g., minus the particular target subscriber device 610) via the local re-broadcast of repeated further group call data 670, and will finally also be provided directly to the particular target subscriber device 610 via repeated further group call data 674. The target subscriber devices 602, SD-BDR 606, and other target subscriber devices 608 may acknowledge the repeated further group call data 664 and 668 via similar optional acknowledgments (not shown) as set forth in acknowledgments 644 and 654. The particular target subscriber device 610 may optionally acknowledge the further group call data via a separately transmitted further group call data acknowledgment 676 transmitted to call controller 114 via its separate air interface uplink and uplink backhaul transmission.

For example, if subscriber device 140a of FIG. 5 roams farther into RF site 111, outside of the range 502 of the local-rebroadcast by SD-BDR/vehicular subscriber device 130c, subscriber device 140a may transmit an error condition notification to call controller 114 via its own maintained or newly established uplink air interface connection (not illustrated) with the fixed node 108, re-establish (if necessary) its own unicast downlink air-interface connection with the fixed node 108, and subsequently receive the further group call data via its own separate unicast downlink and optionally acknowledge the group call data via its own separate air-interface uplink and uplink backhaul transmission to call controller 114.

Of course, if a number of the other target subscriber devices 608 roam out of transmission range of SD-BDR 606, such that the number of other target subscriber devices 608 falls below a predetermined threshold level, such as 5, 10, 50, or 100, call controller 114 may be configured to transfer all of the remaining other target subscriber devices 608 to separate unicast air-interface downlinks as well and to provide further group call data via each separate unicast air-interface downlink. In another embodiment, if a number of the other target subscriber devices 608 roams out of transmission range of SD-BDR 606, such that the number of other target subscriber devices 608 falls below the predetermined threshold level, call controller 114 may be configured to re-execute step 615 and re-determine if a new subset should be created and/or if a new SD-BDR should be selected that would more efficiently continue delivering the group call data via consolidated unicast downlinks in broadband RAN 100.

III. Conclusion

In accordance with the foregoing, an infrastructure device, such as a call controller, is provided to improve efficiency of group calls over broadband RANs by consolidating unicast downlinks in the broadband RAN for a requested new group call, and to manage the consolidation during the group call. As a result, downlink broadband resource usage is substantially reduced, and increased capacity and/or increased numbers of group call subscriber devices can be supported without adding additional infrastructure. Other advantages and benefits are possible as well.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A method for dynamically consolidating unicast downlinks in a broadband radio access network (RAN) for a requested group call, the method comprising:
   receiving, at a call controller, a group call request for a group call from a requesting device;
   identifying, by the call controller, a plurality of target subscriber devices indicated by the group call request for participation in the group call;
   identifying, by the call controller, at least a first subset of target subscriber devices out of the plurality of target subscriber devices that are determined to be within an air-interface downlink wireless communication range of at least one other target subscriber device in the first subset and identifying, by the call controller, each target subscriber device not in a subset;
   selecting, by the call controller, one of the plurality of target subscriber devices in the first subset as a subscriber device to subscriber device broadcast downlink repeater (SD-BDR) for all of the other target subscriber devices in the first subset, informing the selected one of the plurality of target subscriber devices in the first subset that it is the selected SD-BDR for the first subset and instructing the SD-BDR on at least one of a frequency and timeslot on which to locally broadcast provided group call data;
   informing, by the call controller, the other target subscriber devices in the first subset that they are to receive the group call via the selected SD-BDR;
   receiving, by the call controller from the requesting device, group call data associated with the requested group call; and
   providing, by the call controller, the group call data received from the requesting device to each target subscriber device in each identified subset via a corresponding single unicast downlink in the RAN to the subset's corresponding selected SD-BDR and to each target subscriber device not in a subset via corresponding separate single unicast downlinks in the RAN.

2. The method of claim 1, further comprising receiving acknowledgements relative to the provided group call data from each of the target subscriber devices via separate respective unicast uplinks.

3. The method of claim 1, wherein identifying the at least first subset of target subscriber devices further comprises:
   receiving geographic location information from each of the plurality of target subscriber devices and identifying the first subset of target subscriber devices as those providing geographic location information indicating that they are within a predetermined threshold geographic distance from a candidate SD-BDR.

4. The method of claim 3, wherein the predetermined threshold geographic distance is between 0.1 and 10 miles.

5. The method of claim 3, wherein the geographic location information is provided periodically by each of the target subscriber devices.

6. The method of claim 3, wherein the geographic location information is provided upon request by a group call processing device.

7. The method of claim 1, wherein identifying the at least first subset of target subscriber devices out of the plurality of target subscriber devices that are determined to be within a wireless communication range of each other comprises:
   transmitting an instruction to at least one of the target subscriber devices in the first subset to broadcast a beacon signal to surrounding subscriber devices and identifying the first subset of target subscriber devices as those indicating that they detected the beacon signal.

8. The method of claim 7, wherein identifying the first subset of target subscriber devices further comprises identifying those indicating that they detected the beacon signal at a predetermined minimum threshold signal to noise ratio (SNR).

9. The method of claim 8, wherein the predetermined minimum threshold SNR is 10-15 dB.

10. The method of claim 1, wherein identifying the at least first subset of target subscriber devices out of the plurality of target subscriber devices that are determined to be within a wireless communication range of each other comprises:
    transmitting an instruction to a plurality of the target subscriber devices in the first subset to broadcast a beacon signal to surrounding subscriber devices and selecting the SD-BDR as a function of a determined number of target subscriber devices that report receiving each beacon signal and a measured signal to noise ratio (SNR) reported by each target subscriber device for each beacon signal received.

11. The method of claim 1, wherein the broadband network is a long term evolution (LTE) network, and the unicast downlinks include LTE air interface downlinks.

12. The method of claim 1, further comprising:
    receiving a notification from a particular one of the target subscriber devices in the first subset that it is one or both of no longer within range of the selected SD-BDR and not receiving group call data from the selected SD-BDR, and responsively, providing subsequent group call data directly to the particular one of the target subscriber devices via a corresponding separate single unicast downlink.

13. The method of claim 1, further comprising all of the target subscriber devices in the first subset maintaining separate unicast uplinks in the RAN.

14. The method of claim 1, further comprising:
the call controller instructing the target subscriber devices in the first subset on the at least one of the frequency and timeslot on which to locally receive the group call data provided by the selected SD-BDR.

15. A method at a subscriber device to subscriber device broadcast downlink repeater (SD-BDR) capable subscriber device configured to aid a broadband radio access network (RAN) in consolidating unicast downlinks for a requested group call, the method comprising:
responsive to receiving a request from a call controller, one of (i) determining a geographic location of the SD-BDR capable subscriber device and providing the geographic location of the SD-BDR capable subscriber device to the call controller and (ii) broadcasting a beacon to nearby subscriber devices, receiving beacons broadcast from the nearby subscriber devices, and reporting measured beacon parameters of the beacons broadcast from the nearby subscriber devices to the call controller;
receiving an instruction from the call controller indicating that the SD-BDR capable subscriber device has been selected by the call controller to rebroadcast received group call data associated with the requested group call to other target subscriber devices in a first subset of subscriber devices identified by the call controller, the instruction identifying at least one of a local frequency and time slot on which to rebroadcast the group call data;
receiving the group call data from call controller via a single unicast downlink in the RAN;
playing back the group call data at the SD-BDR capable subscriber device via one of an output transducer and a display; and
rebroadcasting the group call data locally to the other target subscriber devices in the first subset on the one of the local frequency and time slot.

16. The method of claim 15, wherein the RAN is a broadband RAN and the SD-BDR capable subscriber device rebroadcasts the group call data locally via one of a DMR compliant protocol, a P25 compliant protocol, a Wi-Fi compliant protocol, a WiMAX compliant protocol, and a TETRA compliant protocol.

17. The method of claim 15, further comprising providing acknowledgments to the call controller acknowledging receipt of the group call data via a separate air-interface uplink in the broadband RAN established for the SD-BDR, and refraining from providing any group call data acknowledgments to the call controller on behalf of the target subscriber devices receiving the locally rebroadcast group call data.

18. The method of claim 17, wherein the target subscriber devices receiving the locally rebroadcast group call data each maintain separate uplinks via the RAN and transmit group data acknowledgments to the call controller via their respective separate uplinks.

19. A network information device (NID) for dynamically consolidating unicast downlinks in a broadband radio access network (RAN) for a requested group call, the NID comprising:
a memory storing executable instructions;
a transceiver; and
a processor that is configured, responsive to executing the executable instructions, to perform a set of functions comprising:
receiving a group call request for a group call from a requesting device via the transceiver;
identifying a plurality of target subscriber devices indicated by the group call request for participation in the group call;
identifying at least a first subset of target subscriber devices out of the plurality of target subscriber devices that are determined to be within an air-interface downlink wireless communication range of at least one other target subscriber device in the first subset and identifying each target subscriber device not in a subset;
selecting one of the plurality of target subscriber devices in the first subset as a subscriber device to subscriber device broadcast downlink repeater (SD-BDR) for all of the other target subscriber devices in the first subset, informing the selected one of the plurality of target subscriber devices in the first subset that it is the selected SD-BDR for the first subset and instructing the SD-BDR on at least one of a frequency and timeslot on which to locally broadcast provided group call data;
informing the other target subscriber devices in the first subset that they are to receive the group call via the selected SD-BDR;
receiving group call data, from the requesting device via the transceiver, associated with the requested group call; and
providing the group call data received from the requesting device to each target subscriber device in each identified subset via the transceiver and a corresponding single unicast downlink in the RAN to the subset's corresponding selected SD-BDR and to each target subscriber device not in a subset via the transceiver and corresponding separate single unicast downlinks in the RAN.

20. A subscriber to subscriber device broadcast downlink repeater (SD-BDR) capable subscriber device for dynamically consolidating unicast downlinks in a broadband radio access network (RAN) for a requested group call, the subscriber device comprising:
a memory storing executable instructions;
a first transceiver and a second transceiver; and
a processor that is configured, responsive to executing the executable instructions, to perform a set of functions comprising:
responsive to receiving a request from a call controller, via the first transceiver, one of (i) determine a geographic location of the SD-BDR capable subscriber device and providing the geographic location of the SD-BDR capable subscriber device to the call controller and (ii) broadcasting a beacon to nearby subscriber devices via the second transceiver, receiving beacons broadcast from the nearby subscriber devices via the second transceiver, and reporting measured beacon parameters of the beacons broadcast from the nearby subscriber devices to the call controller via the first transceiver;
receiving an instruction from the call controller, via the first transceiver, indicating that the SD-BDR capable subscriber device has been selected by the call controller to rebroadcast received group call data associated with the requested group call to other target subscriber devices in a first subset of subscriber devices identified by the call controller, the instruction identifying at least one of a local frequency and time slot on which to rebroadcast the group call data;

receiving the group call data from call controller via the first transceiver and a single unicast downlink in the RAN;

playing back the group call data at the SD-BDR capable subscriber device via one of an output transducer and a display; and rebroadcasting the group call data locally to the other target subscriber devices in the first subset via the second transceiver on the one of the local frequency and time slot.

* * * * *